United States Patent
Birnbaum et al.

(10) Patent No.: US 11,019,266 B1
(45) Date of Patent: May 25, 2021

(54) BLUNTING OPTICAL SUSPENSION SPRINGS FOR PARTICLE REDUCTION

(71) Applicant: Apple Inc., Cupertino, CA (US)

(72) Inventors: Zachary W. Birnbaum, Saratoga, CA (US); Scott Wallace Miller, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/549,682

(22) Filed: Aug. 23, 2019

Related U.S. Application Data

(60) Provisional application No. 62/726,156, filed on Aug. 31, 2018.

(51) Int. Cl.
  *H04N 5/232* (2006.01)
  *G03B 13/36* (2021.01)

(52) U.S. Cl.
  CPC ......... *H04N 5/23287* (2013.01); *G03B 13/36* (2013.01); *H04N 5/23212* (2013.01)

(58) Field of Classification Search
  CPC ........... H04N 5/23287; H04N 5/23212; H04N 5/2253; H04N 5/2254; G03B 13/36
  See application file for complete search history.

(56) References Cited

U.S. PATENT DOCUMENTS

| | | |
|---|---|---|
| 9,454,016 B1 | 9/2016 | Ladwig et al. |
| 2010/0328791 A1* | 12/2010 | Jung ................ H04N 5/2328 359/824 |
| 2016/0227088 A1 | 8/2016 | Brown et al. |
| 2017/0171469 A1* | 6/2017 | Sekimoto ........... H04N 5/23287 |
| 2017/0299945 A1 | 10/2017 | Suzuki et al. |
| 2018/0059381 A1* | 3/2018 | Sharma ............... H04N 5/2254 |

* cited by examiner

*Primary Examiner* — Shahbaz Nazrul
(74) *Attorney, Agent, or Firm* — Robert C. Kowert; Kowert, Hood, Munyon, Rankin & Goetzel, P.C.

(57) ABSTRACT

A suspension spring may suspend an optical component for a camera or other device that implements the optical component to focus light being captured by an image sensor. The suspension spring may move along with the optical component that it suspends as a result of manual or automated focus changes that change the position of the optical component along an optical axis. The suspension spring may make contact with surfaces of other components or materials in the cameras or other systems. Those surfaces of the suspension spring that can make contact may be blunted to prevent the generation of loose particles that can interfere with the image sensor.

20 Claims, 8 Drawing Sheets

BLUNTING OPTICAL SUSPENSION SPRINGS FOR PARTICLE REDUCTION

RELATED APPLICATIONS

This application claims benefit of priority to U.S. Provisional Application Ser. No. 62/726,156 entitled "BLUNTING OPTICAL SUSPENSION SPRINGS FOR PARTICLE REDUCTION," filed Aug. 31, 2018, and which is incorporated herein by reference in its entirety.

BACKGROUND

Technical Field

This disclosure relates generally to control of the motion of camera components.

Description of the Related Art

The advent of small, mobile multipurpose devices such as smartphones and tablet or pad devices has resulted in a need for high-resolution, cameras for integration in the devices. Some cameras may implement optical image stabilization (OIS) to sense and react to external excitation or disturbance by adjusting location of the optical lens on the X and/or Y axis in an attempt to compensate for unwanted motion of the lens. Some cameras may implement autofocus (AF) whereby the object focal distance can be adjusted to focus an object plane or field in front of the camera at an image plane to be captured by an image sensor (also referred to herein as a photosensor). In some implementations of autofocus, the optical lens may be moved as a single rigid body along the optical axis (referred to as the Z axis) of the camera to refocus the camera. In addition, high image quality is easier to achieve in cameras if lens motion along the optical axis is accompanied by minimal parasitic motion in the other degrees of freedom, for example on the X and Y axes orthogonal to the optical (Z) axis of the camera. Thus, some cameras that implement autofocus may also implement optical image stabilization (OIS) to sense and react to external excitation or disturbance by adjusting location of the optical lens on the X and/or Y axis in an attempt to compensate for unwanted motion of the lens.

SUMMARY OF EMBODIMENTS

An actuator component for controlling the position of an optics component relative to the image sensor along an optical axis may be implemented. In some embodiments, the optics component and at least some components of the actuator component may be suspended using optical suspension springs (referred to herein as "suspension springs") over a base of an actuator, with the image sensor disposed at or below the base. The suspension springs may allow motions of the optics component (e.g., a lens or lens system) relative to the image sensor. For example, the actuator may move the optics component along the optical axis to provide manual or autofocus (AF) capabilities, which could result in a contact between a suspension spring and another surface (e.g., a surface of the actuator component or optics component). Contact between a suspension spring and another surface could occur as a result of a quick movement external physical contact (e.g., dropping a device implementing the optics component and actuator). Surfaces of the suspension springs may be blunted so that if the blunted surface makes contact with another surface, the blunted surface does not generate particles that can rest upon or otherwise interfere with other components, such as an image sensor.

Figure 1A:
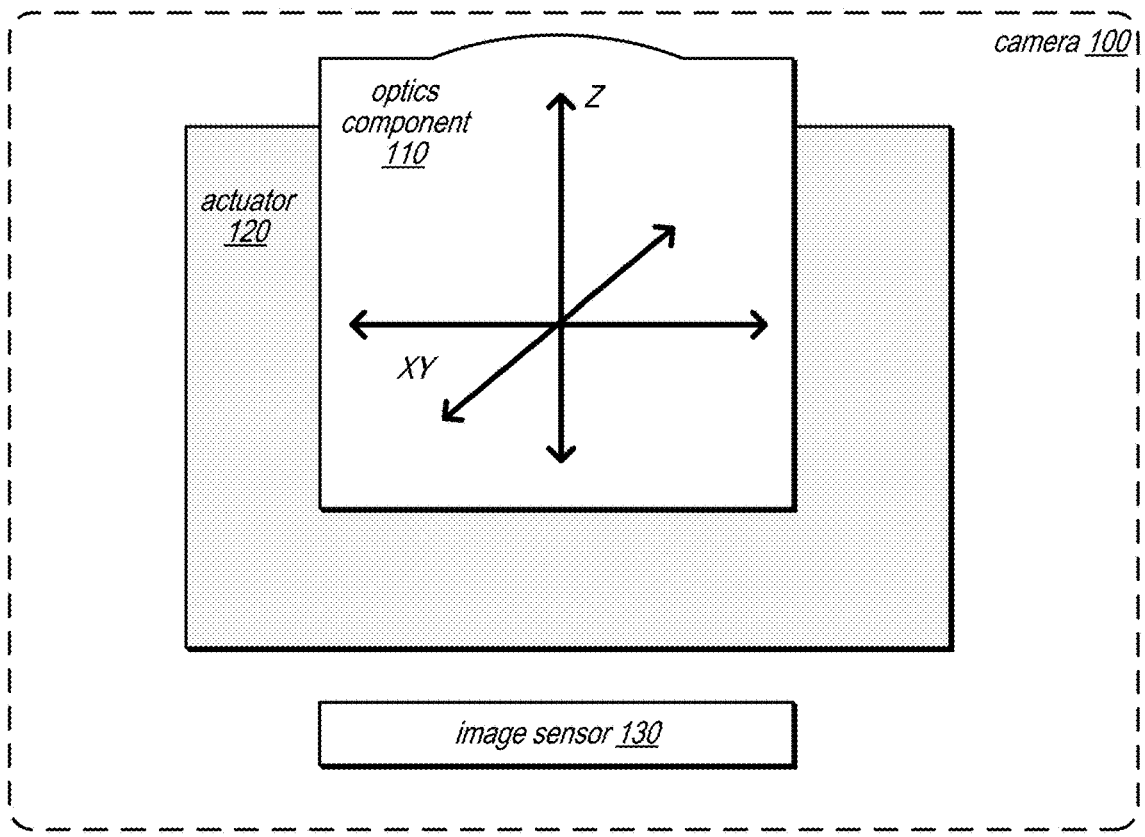
FIGS. 1A and 1B illustrate motion of an optics component within an actuator, according to at least some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Various embodiments of blunted suspension springs to prevent the generation of loose particles are described herein. For example, an apparatus for controlling motions of an optics component relative to an image sensor within a camera may include an actuator for controlling the position of the optics component relative to the image sensor along an optical axis of the camera. In some embodiments, an optics assembly that includes an optics component and that may also include at least some components of the actuator (e.g., magnets and/or coils, and a holder thereof) may be suspended on wires and springs over a base of the actuator, with the image sensor disposed at or below the base. Each suspension wire may be substantially parallel to the optical axis, in some embodiments. In at least some embodiments, the wires are capable of bending deformations that allow the optics component to move in linear directions orthogonal to the optical axis (i.e., on the XY plane). Each suspension spring may be substantially orthogonal to the optical axis, in some embodiments. For example, a suspension spring may be relatively thin in the Z direction and wide in the XY plane. A suspension spring may be cut or otherwise produced from a planar sheet of material, such as metal sheet or other stiff sheet material, in some embodiments, which may result in a greater stiffness in the XY plane than in the Z direction. For example, in at least some embodiments, the suspension springs may be capable of bending deformations (because of the reduced stiffness in the Z direction) that allow the optics component to move along the optical axis (e.g., Z direction).

In some embodiments, the actuator may support implementation of autofocus (AF) by moving the optics component along an optical (Z) axis within the optics assembly. In some embodiments, the actuator may also support implementation of optical image stabilization (OIS). In some embodiments, the actuator may be implemented as a voice coil motor (VCM) actuator.

In embodiments of blunting suspension springs, suspension spring edges may be blunted along one or more edges to reduce or halt the generation of particles from other surfaces of other components that are capable of coming into contact with the suspension springs, such as optical components or actuator components that support implementation of OIS or AF. In this way, an image sensor located in a device, such as a camera, that suspends optical components to facilitate (XY) and (Z) movements using suspension springs, may avoid the interference of such particles when capturing image data. For example, a suspension spring may be implemented from a metal material, such as a copper alloy, which may create a sharp edge when formed. If the sharp edge of the metal suspension spring were to make contact with a softer surface (or with a surface susceptible to particle generation as a result of the force or shape of the edge of the suspension spring), such as a plastic surface, particles could be created by the contact of the sharp edge and come to rest on the surface of the image sensor. These particles may interfere with the collection of image data at those locations where the particles rest on the surface of the image sensor.

Figure 1B:
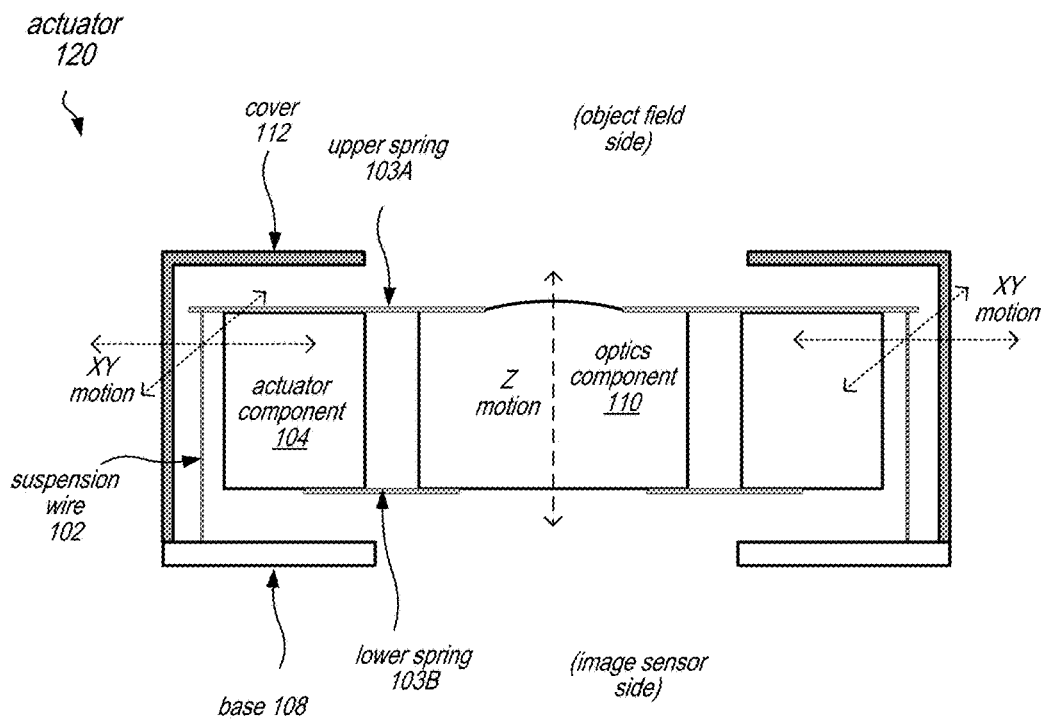

FIGS. 1A and 1B illustrate motion of an optics component 110 within an actuator 120, which may both be within a camera 100 that also includes an image sensor 130, according to at least some embodiments. Optics component 110 may direct light (e.g., via one or more lens) to image sensor 130 along the optical (Z) axis. In at least some embodiments, camera 100 may be a miniature or small form factor camera suitable for small, mobile multipurpose devices such as cell phones, smartphones, and pad or tablet devices, such as device 700 discussed below with regard to FIGS. 7 and 8.

As shown in FIG. 1A, actuator 120 may cause movement of optics component 110 in an XY plane and Z plane to support optical image stabilization (OIS) and autofocus (AF) for camera 100. For example, actuator 120 may cause movement of optics component 110 orthogonal to the optical axis (Z) along the XY plane to cause movements that provide OIS relative to sensor 130. Similarly, actuator 120 may cause movement of optics component 110 along the Z axis to focus light along the optical path to image sensor 130, such as movements that are performed as part of AF. In at least some embodiments, the actuator 120 may be a voice coil motor (VCM) actuator. In some embodiments, different actuator components of actuator 120 may perform different movements (e.g., a one or more VCMs may perform XY plane movements, and a different one or more VCMs may perform Z axis movements).

FIG. 1B illustrates components of an example of actuator 120 that provides X, Y and Z motions for optics component 110, according to at least some embodiments. In some embodiments, an optics assembly may include an optics component 110 that is coupled to an actuator component 104 by upper and/or lower springs 103A and 103B. Note that the object field side of the optics component 110 may be referred to as the top or upper side or surface of the actuator 120 and optics assembly, while the image sensor side of the optics component 110 may be referred to as the bottom or lower side or surface of the actuator 120 and optics assembly. The actuator component 104 may, for example, include magnets used in a voice coil motor (VCM) actuator. The springs 103A and 103B may be sufficiently flexible to allow motion of the optics component 110 on the Z axis relative to the actuator component 104 (although the springs 103A and 103B may still be rigid enough to suspend the optics component). The actuator component 104 may be configured to move the optics component 110 on the Z axis within the actuator 120 to provide focusing (e.g., manually requested focusing or automated focusing for AF) for camera 100. Note that in some embodiments instead of being couple to actuator component 104, springs 103A and 130B may be connected to another component (e.g., a frame component) to suspend the optics component 110. In such an embodiment, the components of the actuator may not be directly connected to the other component (e.g., to the frame component).

Optics component 110, actuator component 104, and springs 103A and 103B, may be suspended within the actuator 120 on two or more suspension wires 102. For example, the suspension wires 102 may be mounted to base 108, and these components may be suspended on the wires 102 at the outer portion of the upper springs 103A. The suspension wires 102 may be flexible to allow motion of the optics component, and thus of the optics component 110, on the XY axes orthogonal to the Z (optical) axis of the optics component 110.

Figure 2:
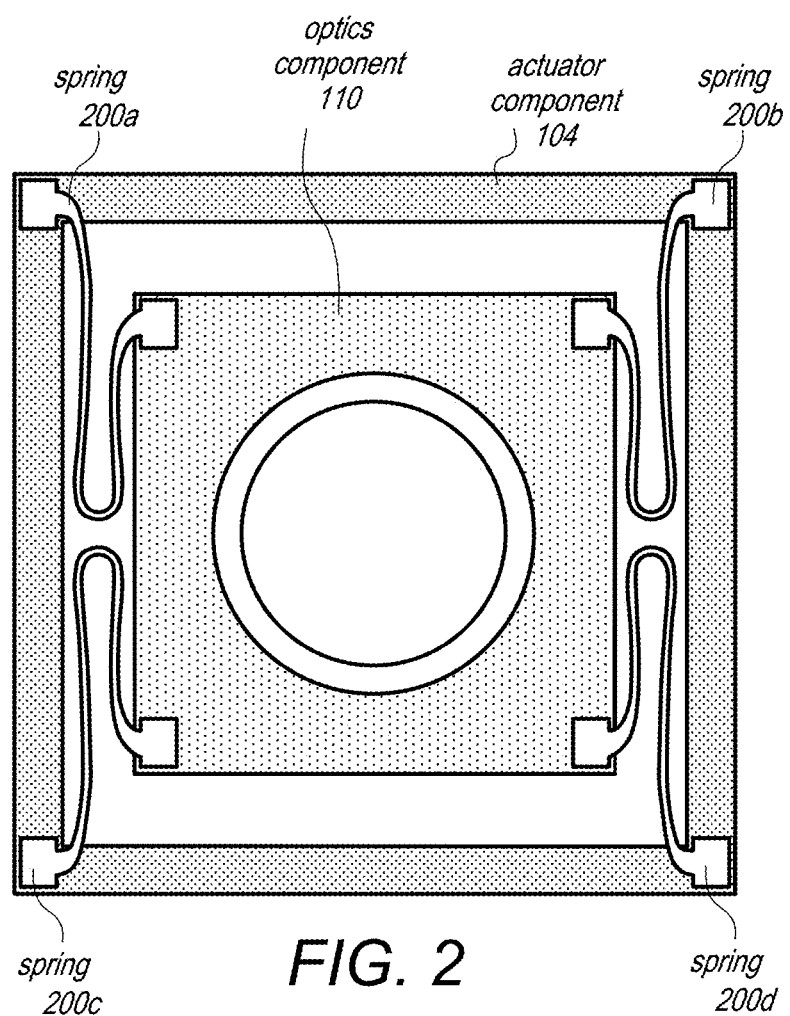
FIG. 2 illustrates example suspension spring placements, according to some embodiments.

As noted above suspension springs, such as upper spring 103a and lower spring 103b may be placed to suspend optics component 110. FIG. 2 illustrates example suspension spring placements in a top view, according to some embodiments. Springs 200a, 200b, 200c, and 200d may, for instance, be upper springs like upper spring 103a in FIG. 1B. However, a similar placement of springs relative to optics component 110 and actuator component 104 may be used for lower spring 103b. In some embodiments, the placements and/or shape of lower spring 103b may differ from upper spring 103a. In some embodiments (not illustrated), the shape of upper springs may differ in similar or different placements. Thus, the placement of suspension springs 200 in FIG. 2 is not intended to be limiting as to various other placements of suspension springs for an optical component in which contact between the suspension springs and other components can occur.

Figure 3A:
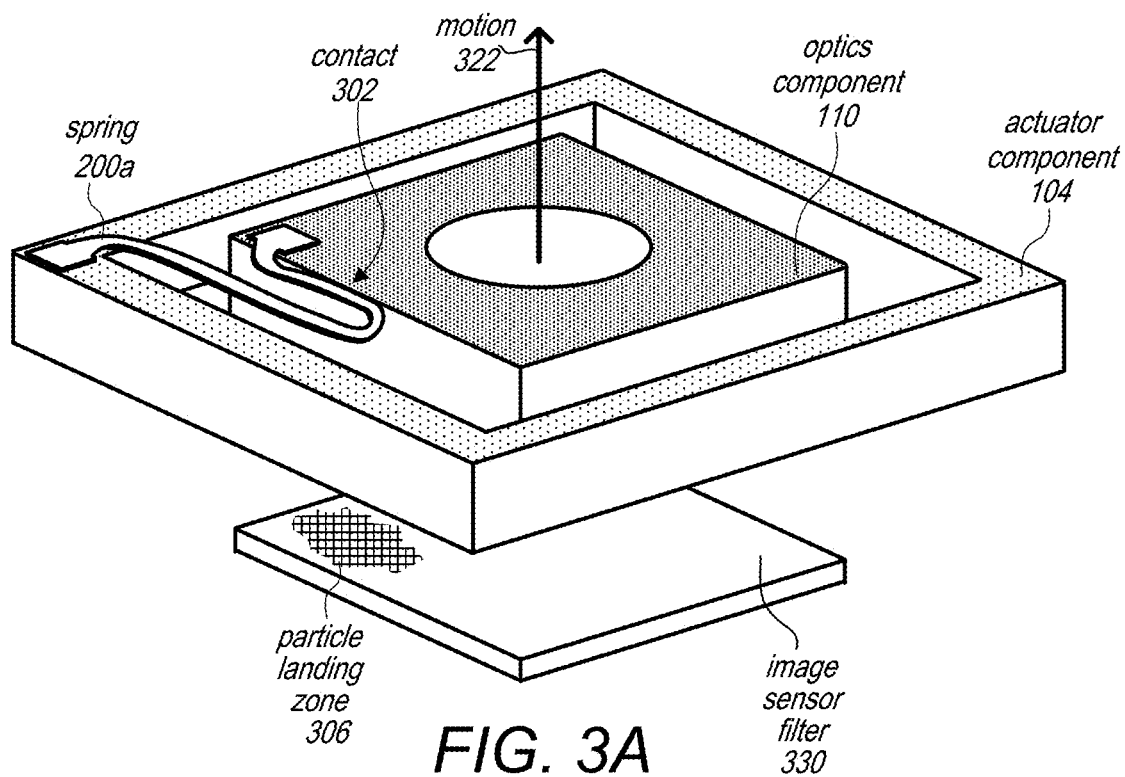
FIGS. 3A and 3B illustrate contact of a suspension spring with other surfaces as a result of optics component motion, according to at least some embodiments.
Figure 3B:
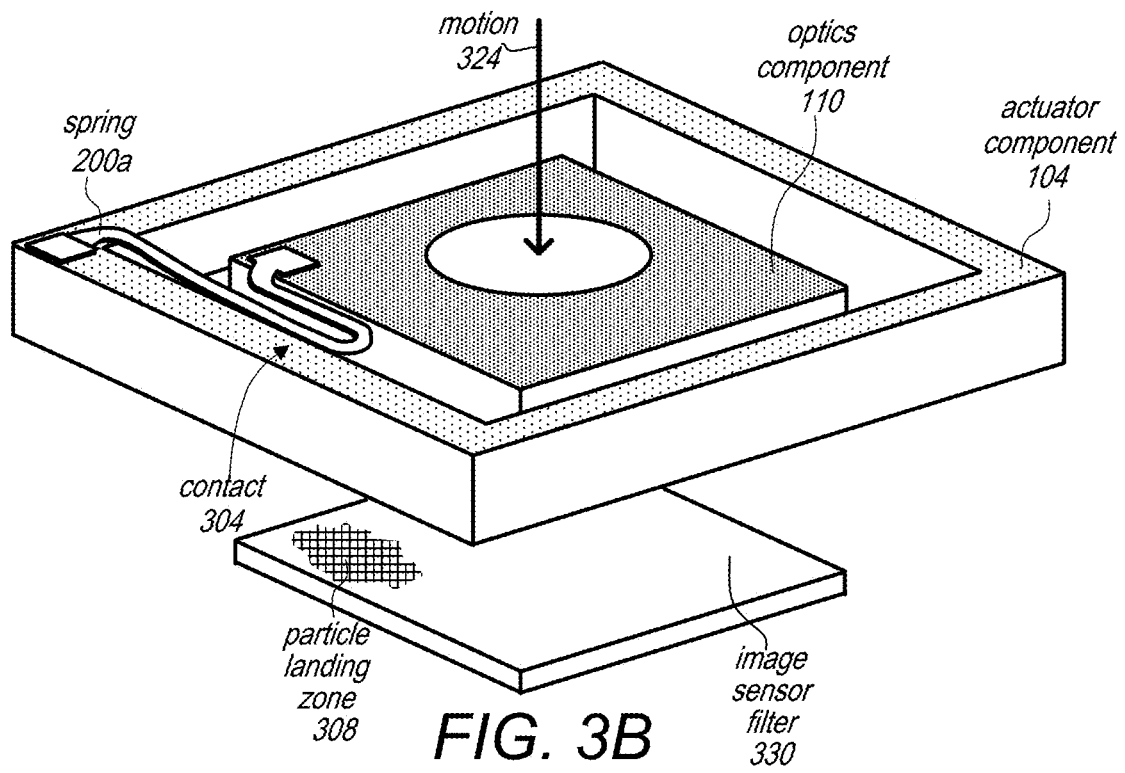

FIGS. 3A and 3B illustrate an example of contact of a suspension spring with camera components as a result of optics component motion, according to at least some embodiments. In FIG. 3A, motion 322 of optics component 110 may be an outward motion toward an object field along an optical axis (Z). Although such a movement 322 could be triggered by actuator component 104, other forces separate from actuator component 104 could cause movement 322. For example, dropping a device, like portable multifunction device 700, that includes a camera could cause the motion, or other swift movement that occurs as a result of external forces (e.g., person, machine, or vehicle or otherwise moving a device 700 rapidly and then rapidly stopping).

Contact 302 may occur between spring 200a and optics component 104. However, numerous other components or surfaces within a camera could come into contact in the event of a movement (e.g., dampers or cushioning material for instance that prevents spring 200a or optics component 110 from striking other surfaces in camera 100 with too much force in drop or other external force events as discussed above). Components that are not illustrated could be above or below the illustrated components and surfaces of these other components could make contact in addition to (or instead of) the illustrated contact 302 (and 304 discussed below). In at least some embodiments, contact may only occur outside of the range of motion caused by actuator component 104 (e.g., in drop, hard set down, or other scenarios where external forces act to cause motion of the optics component 110).

Particle landing zone 306 may provide an example portion of the surface of an image sensor filter 330 (e.g., an infrared (IR) light filter) for image sensor 130 where particles generated as a result of the contact could come to rest. However, other objects, or the image sensor 130 itself could be a surface upon which particles could rest that would interfere with image sensor 130's ability to capture light. Thus, this illustrated example of a particle landing zone is not intended to be limiting.

In another example of contact illustrated in FIG. 3B, motion 324 of optics component 110 may be an inward motion toward image sensor 130 along an optical axis (Z). Although such a motion 324 could be triggered by actuator component 104, other forces separate from actuator component 104 could cause motion 322 (and may in some embodiments be the only forces capable of causing contacts 302 and 304). Contact 304 may occur between spring 200a and actuator component 104. Particle landing zone 308 may provide an example portion of the surface of image sensor filter 330 where particles generated as a result of the contact could come to rest. However, as noted above, other surfaces of other components may interfere with image sensor 130 if particles land upon them.

For ease of illustration, a single spring, spring 200a has been illustrated in FIGS. 3A and 3B. Please note that contact for other springs (e.g., springs 200b, 200c, and 200d) not illustrated could also occur. Moreover, springs like lower spring 103b could also make contact with camera components in similar scenarios although not illustrated in FIGS. 3A and 3B.

Various embodiments of blunting suspension springs may be implemented to reduce or eliminate the generation of particles from contact with camera components, like the scenarios discussed above with regard to FIGS. 3A and 3B. In some embodiments, a coating material (e.g., a polymer-based coating material) may be applied to a suspension spring in order to blunt edges or any other portion of a spring surface that would otherwise generate particles from camera components (e.g., by breaking loose portions of a component). In some embodiments, a polymer or polyimide coating may be applied to a suspension spring, such as polymer-based coatings 430, 420, and 410 illustrated in FIGS. 4A-4C.

Figure 4A:
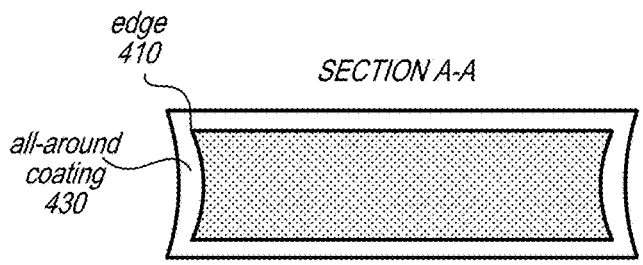
FIGS. 4A-4D illustrate example embodiments of polymer coatings to blunt suspension spring edges, according to at least some embodiments.
Figure 4B:
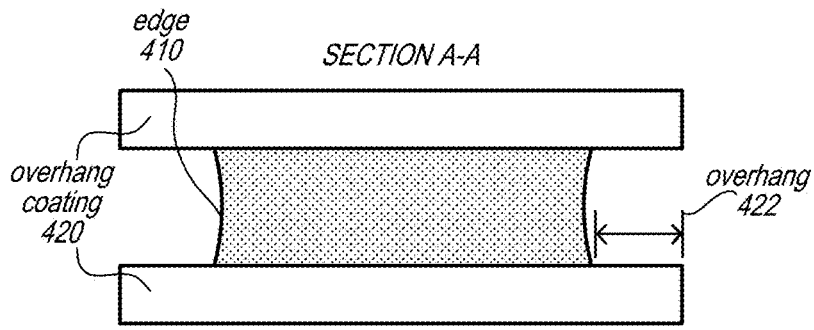
Figure 4C:
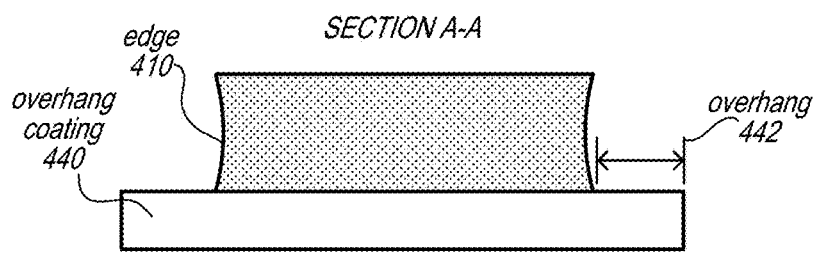
Figure 4D:
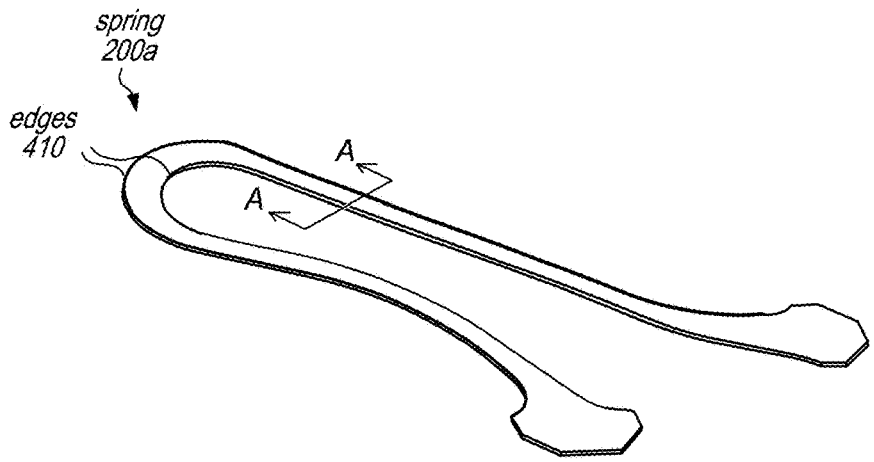

FIG. 4D illustrates an example view of a suspension spring 200a that indicates a cross section A-A to illustrate different polymer-based coatings with respect to blunting edges 410. In FIG. 4C, only the lower surface of spring 200a is coated with an overhang coating 440 that overhangs edge 410 according to an overhang measure 442. However, other surfaces of spring 200a could be coated in addition to or instead of the lower surface. For instance, as illustrated in FIG. 4A, a polymer-based coating could be applied on an entire surface of a spring, such as all-around coating 430 as seen by cross section A-A of spring 200a, (or an entire surface of a spring that could possible come in contact with another component as a result of a movement of the spring, such as coating all surfaces of a spring but those surfaces bonded, connected, or otherwise coupled to another component). In this way surfaces of spring 200a, such as edge 410, could be blunted by the polymer coating 430 to prevent generation of particles because the polymer would make contact with the camera components instead of the un-coated surface of the spring 200a.

Not all surfaces would have to be coated in order to provide some reduction in the generation of particles. In FIG. 4B, a coating may be applied to an upper and lower surface of the spring cross section A-A, which may also overhang 420 according to an overhang measure 422 to block contact with the coated surfaces and the surfaces within the overhang coating 420 (e.g., edge 410). An overhang measure may, in some embodiments be determined in consideration of the distance needed to block portions of a camera component from reaching a non-coated surface of spring 200a (e.g., based on the various bends that a spring could make relative to the various surfaces of camera components that could come into contact with spring 200a, such as a range between 1 and 50 micrometers nominally). Overhang measures such as overhang measure 422 could be different for each overhang coating (different for the upper and lower surfaces) of different surfaces of the same spring.

Some consideration when applying a coating may be given to the coating thickness so as not to interfere with the flexibility provided by spring 200a to facilitate optics component 110 movement. If, for instance, a spring thickness were between 25 and 30 micrometers thick, then an all-around polymer coating may be between 3 and 7 micrometers thick, in some embodiments. An overhang coating, like overhang coatings 420 and 440, may be thicker than an all-around coating 420 in order to ensure the durability of the overhang portions of the coatings 420 and 440, in some embodiments. For example, for a similarly thick spring (e.g., between 25 and 30 micrometers), an overhang polymer coating may be between 1 and 20 micrometers thick nominally.

Figure 5A:
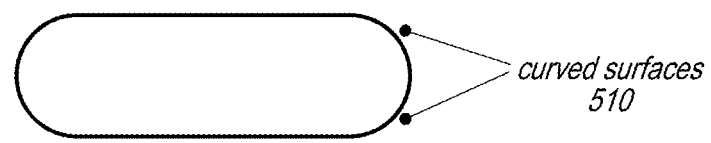
FIGS. 5A-5B illustrate example embodiments of curved suspension spring surfaces to blunt suspension spring edges, according to at least some embodiments.
Figure 5B:
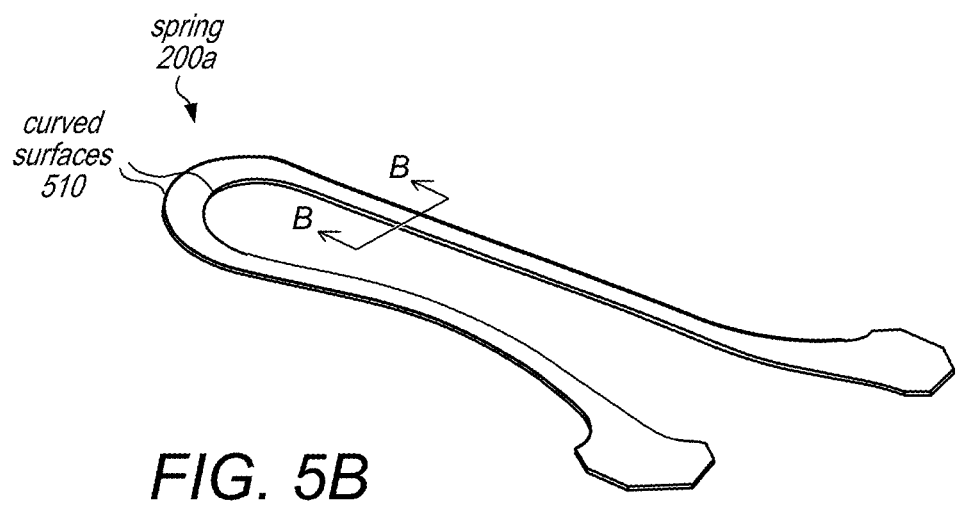

Other techniques for blunting suspension springs may be implemented, in some embodiments. FIG. 5B illustrates spring 200*a* with an altered surface shape that curves surfaces to remove edges from the surface of spring 200*a*, such as curved edges 410. Cross section B-B depicted in FIG. 5A illustrates how the short side surfaces of the spring can be curved to reduce the likelihood of contact with spring 200*a* and a camera component surface from breaking particles loose. The angle and technique for producing curved surfaces may depend upon the material of spring 200*a*, in some embodiments. For example, edges similar to those illustrated in FIGS. 4A-4C may be produced and then rounded to generate a curved surface. Like the coating examples discussed above, angles for curved surfaces 510 may be chosen so as not to interfere with the flexibility of spring 200*a* to support optics system 110 movements.

Figure 6:
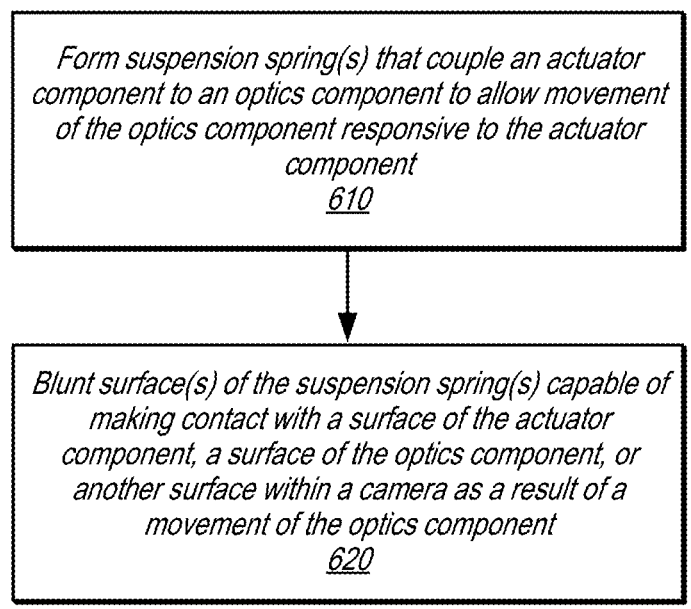
FIG. 6 is a flowchart illustrating methods and techniques for blunting suspension springs for particle reduction, according to some embodiments.

FIG. 6 is a flowchart illustrating methods and techniques for blunting suspension springs for particle reduction, according to some embodiments. As indicated at 610, one or more suspension springs may be formed that couple an actuator component to an optics component to allow movement of the optics component responsive to the actuator component, in various embodiments, such as the suspension springs discussed above with regard to FIGS. 1B-3B. Suspension springs may be formed from metallic materials, such as a copper alloy, in some embodiments. In some embodiments, suspension springs may be harder than other surfaces into which a suspension spring may come into contact (e.g., an optics component). For example, an optics component (or surface thereof) may be made of a plastic material. Formation of the suspension spring(s) may create one or more edges along the suspension spring which may be sharp enough to cut, break, scrape, or otherwise damage another surface, generating loose particles from the surface.

As indicated at 620, one or more surfaces of the suspension spring(s) capable of making contact with a surface of the actuator component, a surface of the optics component, or another surface within, for instance, a camera as a result of a movement of the optics component may be blunted, in various embodiments. For example, as discussed above with regard to FIGS. 4A-4C, a polymer-based coating (e.g., a polyimide) may be applied to the one (or more) surfaces of the suspension spring(s). An all-around coating may be applied, which may coat all surfaces on every side of the suspension spring which may be capable of contact with another surface, in one embodiment. In another embodiment, an overhang coating which may be applied to one or more surfaces of the suspension spring(s) may be applied leaving an overhang portion that extends an overhang measurement's distance beyond an uncoated edge of the suspension spring(s). In one embodiment, the one or more surfaces of the suspension spring may be curved (e.g., by changing the shape of a suspension spring along an edge to remove the edge).

Multifunction Device Examples

Figure 7:
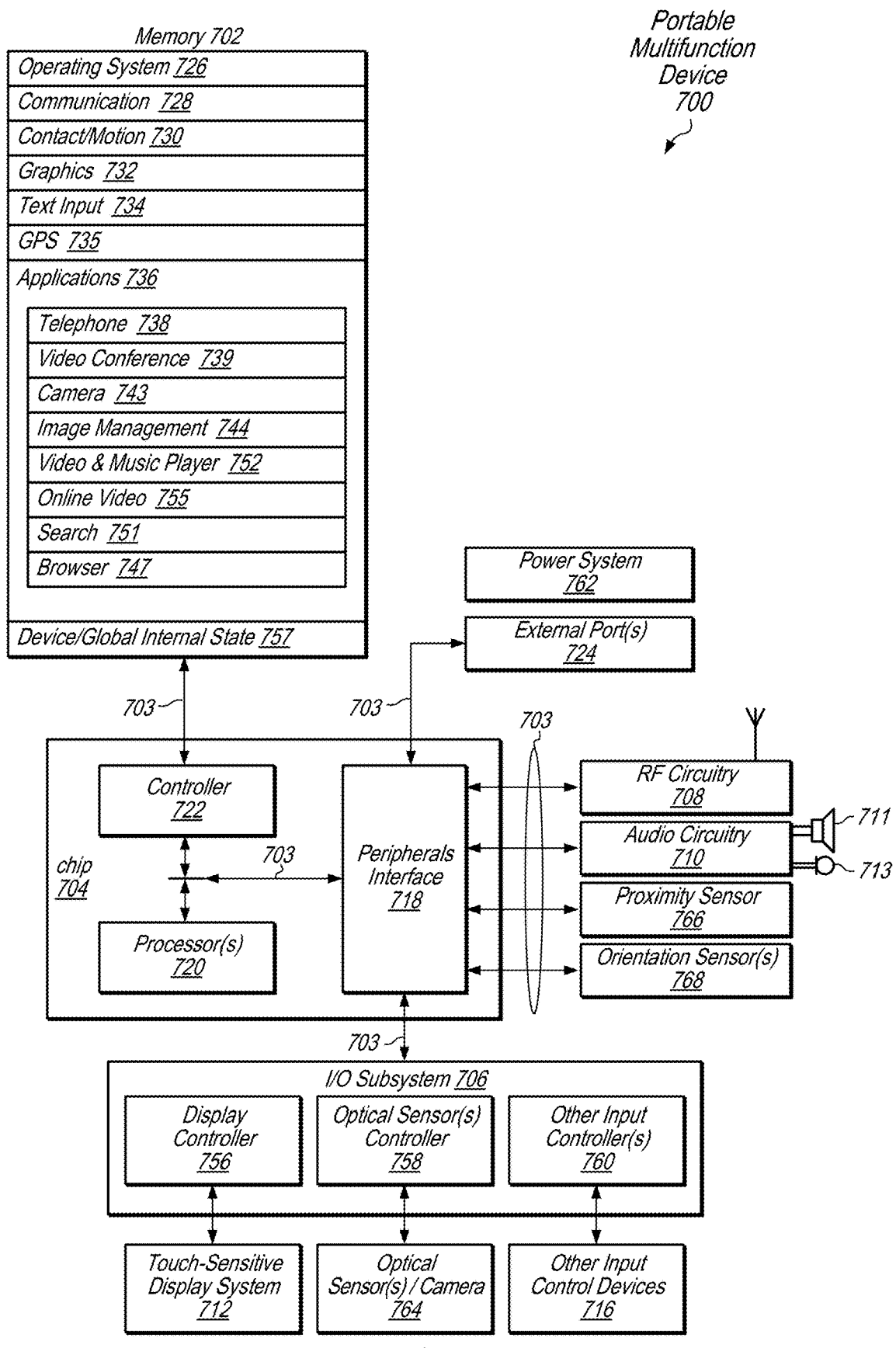
FIG. 7 illustrates a block diagram of a portable multifunction device with a camera in accordance with some embodiments.

FIG. 7 illustrates a block diagram of a portable multifunction device in accordance with some embodiments. In some embodiments, the device is a portable communications device, such as a mobile telephone, that also contains other functions, such as PDA, camera, video capture and/or playback, and/or music player functions. Example embodiments of portable multifunction devices include, without limitation, the iPhone®, iPod Touch®, and iPad® devices from Apple Inc. of Cupertino, Calif. Other portable electronic devices, such as laptops, cell phones, smartphones, pad or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller). In other embodiments, the device is not a portable communications device, but is a camera and/or video camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a streaming video application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Device 700 may include memory 702 (which may include one or more computer readable storage mediums), memory controller 722, one or more processing units (CPU's) 720, peripherals interface 718, RF circuitry 708, audio circuitry 710, speaker 711, touch-sensitive display system 712, microphone 713, input/output (I/O) subsystem 706, other input control devices 716, and external port 724. Device 700 may include one or more optical sensors or cameras 764, which may implement blunted suspension springs according to the techniques discussed above with regard to FIGS. 1-6. These components may communicate over one or more communication buses or signal lines 703.

It should be appreciated that device 700 is only one example of a portable multifunction device, and that device 700 may have more or fewer components than shown, may combine two or more components, or may have a different configuration or arrangement of the components. The various components shown in FIG. 7 may be implemented in hardware, software, or a combination of hardware and software, including one or more signal processing and/or application specific integrated circuits.

Memory 702 may include high-speed random access memory and may also include non-volatile memory, such as one or more magnetic disk storage devices, flash memory devices, or other non-volatile solid-state memory devices. Access to memory 702 by other components of device 700, such as CPU 720 and the peripherals interface 718, may be controlled by memory controller 722.

Peripherals interface 718 can be used to couple input and output peripherals of the device to CPU 720 and memory 702. The one or more processors 720 run or execute various software programs and/or sets of instructions stored in memory 702 to perform various functions for device 700 and to process data.

In some embodiments, peripherals interface 718, CPU 720, and memory controller 722 may be implemented on a single chip, such as chip 704. In some other embodiments, they may be implemented on separate chips.

RF (radio frequency) circuitry 708 receives and sends RF signals, also called electromagnetic signals. RF circuitry 708 converts electrical signals to/from electromagnetic signals and communicates with communications networks and other communications devices via the electromagnetic signals. RF circuitry 708 may include well-known circuitry for performing these functions, including but not limited to an antenna system, an RF transceiver, one or more amplifiers, a tuner, one or more oscillators, a digital signal processor, a coder/decoder (codec) chipset, a subscriber identity (SIM) card, memory, and so forth. RF circuitry 708 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 710, speaker 711, and microphone 713 provide an audio interface between a user and device 700. Audio circuitry 710 receives audio data from peripherals interface 718, converts the audio data to an electrical signal, and transmits the electrical signal to speaker 711. Speaker 711 converts the electrical signal to audible sound waves. Audio circuitry 710 also receives electrical signals converted by microphone 713 from sound waves. Audio circuitry 710 converts the electrical signal to audio data and transmits the audio data to peripherals interface 718 for processing. Audio data may be retrieved from and/or transmitted to memory 702 and/or RF circuitry 708 by peripherals interface 718. In some embodiments, audio circuitry 710 also includes a headset jack. The headset jack provides an interface between audio circuitry 710 and removable audio input/output peripherals, such as output-only headphones or a headset with both output (e.g., a headphone for one or both ears) and input (e.g., a microphone).

I/O subsystem 706 couples input/output peripherals on device 700, such as touch screen 712 and other input control devices 716, to peripherals interface 718. I/O subsystem 706 may include display controller 756 and one or more input controllers 760 for other input control devices 716. The one or more input controllers 760 receive/send electrical signals from/to other input control devices 716. The other input control devices 716 may include physical buttons (e.g., push buttons, rocker buttons, etc.), dials, slider switches, joysticks, click wheels, and so forth. In some alternative embodiments, input controller(s) 760 may be coupled to any (or none) of the following: a keyboard, infrared port, USB port, and a pointer device such as a mouse. The one or more buttons may include an up/down button for volume control of speaker 711 and/or microphone 713. The one or more buttons may include a push button.

Touch-sensitive display 712 provides an input interface and an output interface between the device and a user. Display controller 756 receives and/or sends electrical signals from/to touch screen 712. Touch screen 712 displays visual output to the user. The visual output may include graphics, text, icons, video, and any combination thereof (collectively termed "graphics"). In some embodiments, some or all of the visual output may correspond to user-interface objects.

Touch screen 712 has a touch-sensitive surface, sensor or set of sensors that accepts input from the user based on haptic and/or tactile contact. Touch screen 712 and display controller 756 (along with any associated s and/or sets of instructions in memory 702) detect contact (and any movement or breaking of the contact) on touch screen 712 and converts the detected contact into interaction with user-interface objects (e.g., one or more soft keys, icons, web pages or images) that are displayed on touch screen 712. In an example embodiment, a point of contact between touch screen 712 and the user corresponds to a finger of the user.

Touch screen 712 may use LCD (liquid crystal display) technology, LPD (light emitting polymer display) technology, or LED (light emitting diode) technology, although other display technologies may be used in other embodiments. Touch screen 712 and display controller 756 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 712. In an example embodiment, projected mutual capacitance sensing technology is used, such as that found in the iPhone®, iPod Touch®, and iPad® from Apple Inc. of Cupertino, Calif.

Touch screen 712 may have a video resolution in excess of 100 dpi. In some embodiments, the touch screen has a video resolution of approximately 160 dpi. The user may make contact with touch screen 712 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen 712, device 700 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 712 or an extension of the touch-sensitive surface formed by the touch screen.

Device 700 also includes power system 762 for powering the various components. Power system 762 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 700 may also include one or more optical sensors or cameras 764, such as camera 100 discussed above in FIG. 1. Optical sensor 764 may, for example, include charge-coupled device (CCD) or complementary metal-oxide semiconductor (CMOS) phototransistors or photosensors (e.g., image sensor 130 in FIG. 1). Optical sensor 764 receives light from the environment, projected through one or more lenses, and converts the light to data representing an image. In conjunction with imaging 743 (also called a camera), optical sensor 764 may capture still images and/or video sequences. In some embodiments, at least one optical sensor may be located on the back of device 700, opposite touch screen display 712 on the front of the device. In some embodiments, the touch screen display may be used as a viewfinder for still and/or video image acquisition. In some embodiments, at least one optical sensor may instead or also be located on the front of the device.

Device 700 may also include one or more proximity sensors 766. FIG. 11 shows proximity sensor 766 coupled to peripherals interface 718. Alternatively, proximity sensor 766 may be coupled to input controller 760 in I/O subsystem 706. In some embodiments, the proximity sensor turns off and disables touch screen 712 when the multifunction device is placed near the user's ear (e.g., when the user is making a phone call).

Device 700 may also include one or more orientation sensors 768. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 700. In some embodiments, the one or more orientation sensors include any combination of orientation/rotation sensors. FIG. 11 shows the one or more orientation sensors 768 coupled to peripherals interface 718. Alternatively, the one or more orientation sensors 768 may be coupled to an input controller 760 in I/O subsystem 706. In some embodiments, information is displayed on the touch screen display in a portrait view or a landscape view based on an analysis of data received from the one or more orientation sensors.

In some embodiments, device 700 may also include one or more other sensors (not shown) including but not limited to ambient light sensors and motion detectors. These sensors may be coupled to peripherals interface 718 or, alternatively, may be coupled to an input controller 760 in I/O subsystem 706. For example, in some embodiments, device 700 may include at least one forward-facing (away from the user) and at least one backward-facing (towards the user) light sensors that may be used to collect ambient lighting metrics from the environment of the device 700 for use in video and image capture, processing, and display applications.

In some embodiments, the software components stored in memory 702 include operating system 726, communication 728, contact/motion (or set of instructions) 730, graphics 732, text input 734, Global Positioning System (GPS) 735, and applications 736. Furthermore, in some embodiments memory 702 stores device/global internal state 757. Device/global internal state 757 includes one or more of: active application state, indicating which applications, if any, are currently active; display state, indicating what applications, views or other information occupy various regions of touch screen display 712; sensor state, including information obtained from the device's various sensors and input control devices 716; and location information concerning the device's location and/or attitude.

Operating system 726 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication 728 facilitates communication with other devices over one or more external ports 724 and also includes various software components for handling data received by RF circuitry 708 and/or external port 724. External port 724 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion 730 may detect contact with touch screen 712 (in conjunction with display controller 756) and other touch sensitive devices (e.g., a touchpad or physical click wheel). Contact/motion 730 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion 730 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion 730 and display controller 756 detect contact on a touchpad.

Contact/motion 730 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics 732 includes various software components for rendering and displaying graphics on touch screen 712 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics 732 stores data representing graphics to be used. Each graphic may be assigned a corresponding code. Graphics 732 receives, from applications etc., one or more codes specifying graphics to be displayed along with, if necessary, coordinate data and other graphic property data, and then generates screen image data to output to display controller 756.

Text input 734, which may be a component of graphics 732, provides soft keyboards for entering text in various applications that need text input.

GPS 735 determines the location of the device and provides this information for use in various applications (e.g., to telephone 738 for use in location-based dialing, to camera 743 as picture/video metadata, and to applications that provide location-based services such as map/navigation applications).

Applications 736 may include one or more of, but are not limited to, the following s (or sets of instructions), or a subset or superset thereof:
telephone 738;
video conferencing 739;
camera 743 for still and/or video imaging;
image management 744;
browser 747;
search 751;
video and music player 752, which may be made up of a video player and a music player; and/or
online video 755.
one or more others not shown, such as a gaming.

Examples of other applications 736 that may be stored in memory 702 include but are not limited to other word processing applications, other image editing applications, drawing applications, presentation applications, communication/social media applications, map applications, JAVA-enabled applications, encryption, digital rights management, voice recognition, and voice replication.

In conjunction with RF circuitry 708, audio circuitry 710, speaker 711, microphone 713, touch screen 712, display controller 756, contact 730, graphics 732, and text input 734, telephone 738 may be used to enter a sequence of characters corresponding to a telephone number, access one or more telephone numbers in an address book, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 708, audio circuitry 710, speaker 711, microphone 713, touch screen 712, display controller 756, optical sensor 764, optical sensor controller 758, contact/motion 730, graphics 732, text input 734, and telephone 738, videoconferencing 739 includes executable instructions to initiate, conduct, and terminate a video conference between a user and one or more other participants in accordance with user instructions.

In conjunction with touch screen 712, display controller 756, optical sensor(s) 764, optical sensor controller 758, contact/motion 730, graphics 732, and image management 744, camera 743 includes executable instructions to capture still images or video (including a video stream) and store them into memory 702, modify characteristics of a still image or video, or delete a still image or video from memory 702.

In conjunction with touch screen 712, display controller 756, contact/motion 730, graphics 732, text input 734, and camera 743, image management 744 includes executable instructions to arrange, modify (e.g., edit), or otherwise manipulate, label, delete, present (e.g., in a digital slide show or album), and store still and/or video images.

In conjunction with RF circuitry 708, touch screen 712, display system controller 756, contact/motion 730, graphics 732, and text input 734, browser 747 includes executable instructions to browse the Internet in accordance with user instructions, including searching, linking to, receiving, and displaying web pages or portions thereof, as well as attachments and other files linked to web pages.

In conjunction with touch screen 712, display system controller 756, contact/motion 730, graphics 732, and text input 734, search 751 includes executable instructions to search for text, music, sound, image, video, and/or other files in memory 702 that match one or more search criteria (e.g., one or more user-specified search terms) in accordance with user instructions.

In conjunction with touch screen 712, display system controller 756, contact/motion 730, graphics 732, audio circuitry 710, speaker 711, RF circuitry 708, and browser 747, video and music player 752 includes executable instructions that allow the user to download and play back recorded music and other sound files stored in one or more file formats, such as MP3 or AAC files, and executable instructions to display, present or otherwise play back videos (e.g., on touch screen 712 or on an external, connected display via external port 724). In some embodiments, device 700 may include the functionality of an MP3 player, such as an iPod (trademark of Apple Inc.).

In conjunction with touch screen 712, display system controller 756, contact/motion 730, graphics 732, audio circuitry 710, speaker 711, RF circuitry 708, text input 734, and browser 747, online video 755 includes instructions that allow the user to access, browse, receive (e.g., by streaming and/or download), play back (e.g., on the touch screen or on an external, connected display via external port 724), and otherwise manage online videos in one or more video formats, such as the H.264/AVC format or the H.265/HEVC format.

Each of the above identified s and applications correspond to a set of executable instructions for performing one or more functions described above and the methods described in this application (e.g., the computer-implemented methods and other information processing methods described herein).

These s (i.e., sets of instructions) need not be implemented as separate software programs, procedures or s, and thus various subsets of these s may be combined or otherwise rearranged in various embodiments. In some embodiments, memory 702 may store a subset of the s and data structures identified above. Furthermore, memory 702 may store additional s and data structures not described above.

In some embodiments, device 700 is a device where operation of a predefined set of functions on the device is performed exclusively through a touch screen and/or a touchpad. By using a touch screen and/or a touchpad as the primary input control device for operation of device 700, the number of physical input control devices (such as push buttons, dials, and the like) on device 700 may be reduced.

The predefined set of functions that may be performed exclusively through a touch screen and/or a touchpad include navigation between user interfaces. In some embodiments, the touchpad, when touched by the user, navigates device 700 to a main, home, or root menu from any user interface that may be displayed on device 700. In such embodiments, the touchpad may be referred to as a "menu button." In some other embodiments, the menu button may be a physical push button or other physical input control device instead of a touchpad.

Figure 8:
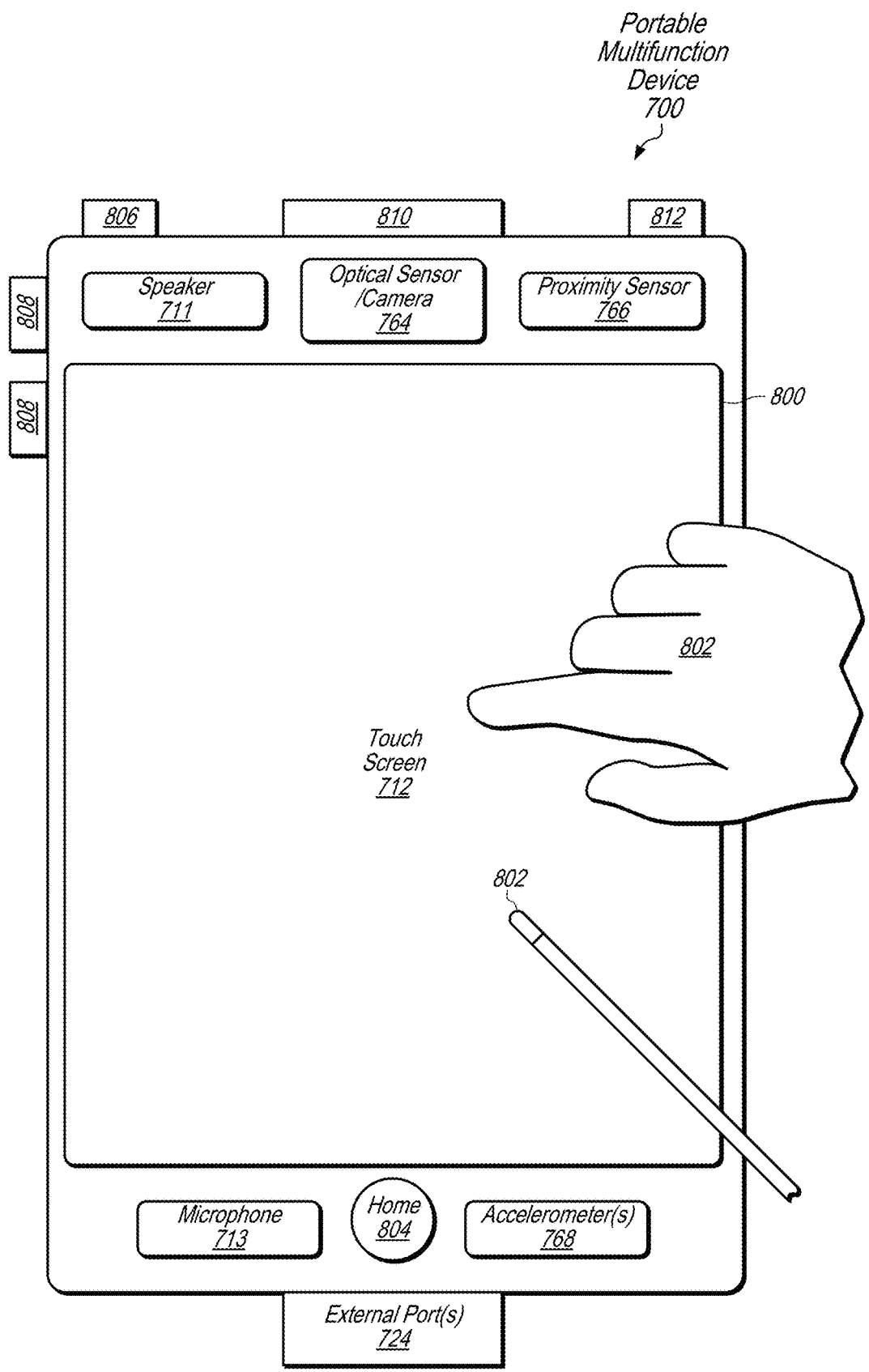
FIG. 8 depicts a portable multifunction device having a camera in accordance with some embodiments.

FIG. 8 illustrates a portable multifunction device 700 having a touch screen 712 in accordance with some embodiments. The touch screen may display one or more graphics within user interface (UI) 800. In at least some embodiments of a device 700, a user may select one or more of the graphics by making a gesture on the graphics, for example, with one or more fingers 802 (not drawn necessarily drawn to scale in the figure) or one or more styluses 803 (not necessarily drawn to scale in the figure).

Device 700 may also include one or more physical buttons, such as a "home" or menu button 804. As described previously, menu button 804 may be used to navigate to any application 736 in a set of applications that may be executed on device 700. Alternatively, in some embodiments, the menu button is may be implemented as a soft key in a GUI displayed on touch screen 712.

In one some embodiments, device 700 includes touch screen 712, home or menu button 804, push button 806 for powering the device on/off and locking the device, volume adjustment button(s) 808, Subscriber Identity (SIM) card slot 810, head set jack 812, and docking/charging external port 724. Push button 806 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 700 also may accept verbal input for activation or deactivation of some functions through microphone 713.

Device 700 may also include one or more cameras 764. A camera 764 may, for example, include charge-coupled device (CCD) or complementary metal-oxide semiconductor (CMOS) phototransistors or photosensors. A camera 764 receives light from the environment, projected through one or more lenses, and converts the light to data representing an image or video frame. In some embodiments, at least one camera 764 may be located on the back of device 700, opposite touch screen display 712 on the front of the device. In some embodiments, at least one camera 764 may instead or also be located on the front of the device with the touch screen display 712, for example so that the user's image may be obtained for videoconferencing while the user views the other video conference participants on the touch screen display 712. In some embodiments, at least one camera 764 may be located on the front of the device 700, and at least one camera 764 may be located on the back of the device 700. In some embodiments, the touch screen display 712 may be used as a viewfinder and/or user interface for still image and/or video sequence acquisition applications.

Device 700 may include video and image processing hardware and/or software, including but not limited to video encoding and/or decoding components, codecs, s, or pipelines, that may be used to capture, process, convert, compress, decompress, store, modify, transmit, display, and otherwise manage and manipulate still images and/or video frames or video sequences captured via camera 764 or otherwise acquired (e.g., via a network interface). In some embodiments, device 700 may also include one or more light or other sensors that may be used to collect ambient lighting or other metrics from the environment of the device 700 for use in video and image capture, processing, and display.

Those skilled in the art will appreciate that portable multifunction device 700 is merely illustrative and is not intended to limit the scope of embodiments. In particular, the portable multifunction device and camera devices may include any combination of hardware or software that can perform the indicated functions, including computers, network devices, Internet appliances, PDAs, wireless phones, pagers, etc. Portable multifunction device 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

What is claimed is:

1. An apparatus, comprising:
   an optics component that is configured to move within the apparatus along an optical axis of the optics component to allow an actuator to cause the optics component to move along the optical axis;
   one or more suspension springs that suspend the optics component to allow the movement of the optics component within the apparatus, wherein the one or more suspension springs respectively couple the optics component to a second component, wherein at least one surface of the suspension spring that is capable of making contact with a surface of the second component, a surface of the optics component, or another surface within the apparatus as a result of a movement of the optics component is coated.

2. The apparatus of claim 1, wherein the coated at least one surface is coated by an all-around polymer-based coating.

3. The apparatus of claim 1, wherein the coated at least one surface is coated by an overhang polymer-based coating applied to the at least one surface such that the overhang polymer-based coating overhangs an uncoated edge of the one or more suspension springs.

4. The apparatus of claim 3, wherein a second surface of the one or more suspension springs is coated by a second overhang polymer-based coating applied to the second surface such that the second overhang polymer-based coating overhangs the uncoated edge of the one or more suspension springs.

5. The apparatus of claim 1, wherein the one or more suspension springs are metal and wherein the surface of the second component, the surface of the optics component, or the other surface within the camera is a plastic surface.

6. The apparatus of claim 1, wherein the surface of the second component, the surface of the optics component, or the other surface within the camera includes a cushioning material.

7. The apparatus of claim 1, wherein the at least one surface capable of making contact with the surface of the second component, the surface of the optics component, or the other surface within the apparatus is capable of the contact outside of a range of movement caused by the actuator.

8. The apparatus of claim 1, wherein the apparatus comprises an image sensor and wherein the actuator comprises a voice coil motor (VCM) that causes movement of the optics component along the optical axis as part of implementing autofocus for the image sensor.

9. The apparatus of claim 1, wherein the apparatus is implemented as part of a portable multifunction device.

10. A camera, comprising:
    an image sensor configured to capture light projected onto a surface of the image sensor;
    an optics component that is configured to move along an optical axis of the optics component to allow an actuator to cause the optics component to move along the optical axis;
    one or more suspension springs that suspend the optics component to allow the movement of the optics component, wherein the one or more suspension springs respectively couple the optics component with a second component, wherein at least one surface of the suspension spring that is capable of making contact with a surface of the second component, a surface of the optics component, or another surface within the camera as a result of a movement of the optics component has a curved edge.

11. The camera of claim 10, wherein the surface of the second component, the surface of the optics component, or the other surface within the camera includes a cushioning material.

12. The camera of claim 10, wherein the one or more suspension springs are metal and wherein the surface of the second component, the surface of the optics component, or the other surface within the camera is a plastic surface.

13. The camera of claim 10, wherein the at least one surface capable of making contact with the surface of the second component, the surface of the optics component, or the other surface within the camera is capable of the contact outside of a range of movement caused by the actuator.

14. The camera of claim 10, wherein the actuator comprises a voice coil motor (VCM) that causes movement of the optics component along the optical axis as part of implementing autofocus for the camera.

15. The camera of claim 10, wherein the camera is implemented as part of a portable multifunction device.

16. A method, comprising:
    forming one or more suspension springs that respectively couple an optics component to a second component to allow movement of the optics component along an optical axis of the optics component responsive to an actuator; and
    blunting at least one surface of the one or more suspension springs capable of making contact with a surface of the second component, a surface of the optics component, or another surface within a camera that includes the optics component and the second component as a result of a movement of the optics component.

17. The method of claim 16, wherein blunting the at least one surface comprises applying an all-round polymer-based coating to the one or more suspension springs.

18. The method of claim 16, wherein blunting the at least one surface comprises applying an overhang polymer-based coating to a first surface of the one or more suspension springs that produces an overhang between an end of the overhang coating and an uncoated edge of the one or more suspension springs.

19. The method of claim 18, wherein blunting the at least one surface further comprises applying a second overhang polymer-based coating to a second surface of the one or more suspension springs that produces a second overhang between an end of the second overhang coating and the uncoated edge of the one or more suspension springs.

20. The method of claim 16, wherein blunting the at least one surface comprises rounding the at least one surface of the one or more suspension springs to produce a curved surface.

* * * * *